United States Patent
Dore

[15] 3,691,484
[45] Sept. 12, 1972

[54] ELECTRO-OPTICAL MODULATORS

[72] Inventor: Marcus John Dore, Bournemouth, England

[73] Assignee: National Research Development Corporation, London, England

[22] Filed: Aug. 13, 1969

[21] Appl. No.: 849,643

[52] U.S. Cl. ..................332/7.51, 350/160, 250/199
[51] Int. Cl. ..............................................H01s 3/10
[58] Field of Search ............332/7.51; 350/160, 150; 250/199

[56] References Cited

UNITED STATES PATENTS

| | | | |
|---|---|---|---|
| 3,367,733 | 2/1968 | Grau | 250/199 |
| 3,413,476 | 11/1968 | Gordon | 332/7.51 |
| 3,462,212 | 8/1968 | Denton | 332/7.51 |
| 3,569,988 | 3/1971 | Schmidt | 250/199 |
| 3,482,101 | 12/1969 | Slaymaker | 250/199 |
| 3,453,561 | 7/1969 | Bonner et al. | 332/7.51 |
| 3,402,002 | 9/1968 | Eden | 350/160 |
| 3,408,131 | 10/1968 | Kapany | 350/160 |
| 3,446,966 | 5/1969 | Peterson | 332/7.51 |
| 3,524,147 | 7/1970 | Soffer et al. | 350/160 |

OTHER PUBLICATIONS

Electronic Design, Vol. 12, No. 15, July 20, 1964 " Laser Beam Steered by Electro–Optic Deflector Cell." Journal of Scientific Inst. Nov. 19, 1964, Vol. 41, " Methods of Modulating Light at Extreme Frequencies." by O. C. Jones.

Primary Examiner—Benjamin A. Borchelt
Assistant Examiner—N. Moskowitz
Attorney—Cushman, Darby & Cushman

[57] ABSTRACT

An electro-optical modulator comprising an electro-optic crystal, means for projecting a beam of light through the crystal on to an optical aperture, and means for applying to the crystal a variable electric field which will be substantially non-uniform across the beam of light in any plane transverse to the path of the beam so as to cause a variable spreading of the beam and thereby modulate the amount of illumination passing through the optical aperture. The electric field may be applied to the crystal by means of two narrow linear electrodes on opposite sides of the crystal and parallel to the path of the beam. The optical aperture may be a translucent aperture in an opaque screen, or it may be one end of a fiber-optic light guide.

An optical alignment system may be formed of one or two such electro-optic modulator crystals, an optical detector for producing an electrical signal representing the amount of illumination passing through the optical aperture and frequency selective means responsive to the said signal. Servo systems may be provided for adjusting the position of the aperture transversely so as to maximize the output of the frequency selective means.

1 Claim, 3 Drawing Figures

ELECTRO-OPTICAL MODULATORS

The present invention relates to electro-optical modulators, which may for instance be used to modulate a beam of coherent light in an optical communications link.

Optical modulation may be achieved by using electro-optic effects in various crystals, and it has been shown that the modulation signal power required for a given application may be minimized by using a long slender crystal. However, none of the known modulator arrangements is really convenient for use in a long slender crystal. Some of the known arrangements make use of variable interference effects between ordinary and extraordinary light waves in birefringent crystals, and are limited by temperature-dependent effects and the tendency of the ordinary and extraordinary waves to become spatially separated. To reduce these difficulties, the crystals may be used in pairs in tandem and accurately temperature-controlled. An alternative possibility is to modulate the beam by controlled deflections relative to a shaped aperture, but known light beam deflection arrangements are also inconvenient for use with a long slender crystal, requiring either a multiplicity of crystal prisms or a crystal with specially shaped hyperboloidal electrodes.

It is an object of the invention to provide a comparatively simple electro-optical modulator requiring only one crystal and conveniently applicable to a long and slender crystal.

According to the present invention there is provided an electro-optical modulator which includes an electro-optic crystal, means for projecting a beam of light through the crystal on to an optical aperture, and means for applying to the crystal a variable electric field which will be substantially non-uniform across the light beam in any plane transverse to its direction of propagation, the orientation of the crystal and the electric field being such that the velocity of propagation of the light forming various parts of the beam will vary with the local variations in the electric field, thereby tending to cause a spreading of the beam dependent on the strength of the applied electric field. The optical aperture may be a transparent pinhole in an opaque screen, or alternatively it may be the end of a fiber-optic light guide. The crystal may be of a material such as ammonium dihydrogen phosphate, potassium dihydrogen phosphate or potassium di-deuterium phosphate. These materials are commonly called ADP, KDP and KD*P respectively. Other suitable materials, such as lithium niobate, are now also known. The direction of propagation of the light beam through the crystal may be at right angles to the c-axis and at 45° to each of the a-axes of the crystal, with the maximum electric field gradient aligned in the direction of the c-axis. The light beam is preferably polarized in a plane at 45° to the crystal c-axis. The crystal is preferably long in the direction of propagation of the light and thin in the direction of the electric field. The electric field may be applied through narrow linear electrodes disposed parallel to the path of the beam of light on opposite sides of the crystal and as close as possible to the beam.

Embodiments of the invention will now be described, by way of example only, with reference to the accompanying drawings, of which FIG. 1 is a schematic perspective drawing of an electro-optical modulator including an electro-optic crystal, and;

Figure 1:
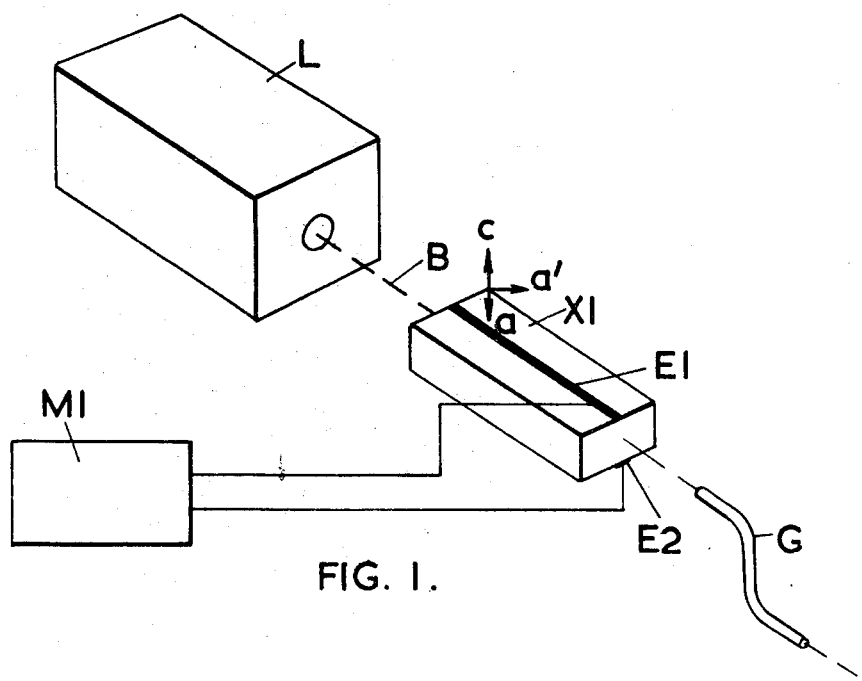

FIG. 1 shows a laser L arranged to project a beam B of coherent light longitudinally through a long slender ADP crystal X1 and on to the end of a fiber-optic light guide G. Arrows marked $c$, $a$ and $a'$ indicate the directions of the axes of the crystal X1; the c-axis is vertical in the embodiment shown. A modulation signal source M1 is electrically connected to a narrow linear electrode E1 formed on the top surface of the crystal X1 and to a similar electrode E2 formed on its underside vertically below the electrode E1. The electrodes E1 and E2 are parallel to each other and to the path of the light beam B which lies midway between them.

When a modulation signal voltage is applied by the source M1 to the electrodes E1 and E2 an electric field is established in the crystal X1. The gradient of the electric field is a maximum in the plane between the electrodes E1 and E2, which is parallel to the c-axis of the crystal and cuts through the center of the light beam B, and it decreases rapidly on both sides of this plane. Due to the electro-optic nature and orientation of the crystal, this field variation produces a corresponding refractive index variation across any plane transverse to the beam path. The refractive index will be most affected where the field is greatest, that is in the center of the light beam B. The refractive index variations resulting from the inhomogeneity of the electric field will tend to spread the sides of the beam away from its center spreading mainly in the direction of the maximum electric field gradients. The light beam B therefore spreads over an area greater than the area of the optical aperture formed by the input end of the fiber-optic light guide G. The extent of the beam spreading and the amount of light transmitted through the fixed aperture formed by the end of the light guide G will be determined by the instantaneous strength of the electric field and therefore by the modulation signal voltage. Hence the light transmitted through the light guide G may be amplitude modulated by variations of the modulation signal voltage.

Modulation voltages of either polarity can cause the beam to spread, and the beam spreading is insensitive to the polarity of the applied voltage. Hence if the modulation voltage is an alternating voltage which reverses its polarity, the light transmitted through the light guide G will tend to be amplitude-modulated according to a wave-form resembling the square of the modulation voltage and therefore having a substantial component at twice the frequency of the modulation voltage signal. This frequency-doubling effect can be avoided if the modulation signal source M1 is arranged to provide a desired modulation signal of suitable amplitude superimposed on a comparatively large direct bias voltage.

Figure 2:
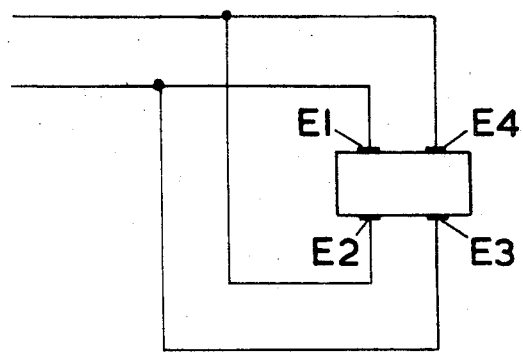
FIG. 2 is a transverse cross-section of an electro-optic crystal provided with an alternative arrangement of electrodes and electrical connections thereto.

Obviously modulation can be achieved with other electrode arrangements in other embodiments of the invention. For instance the electrode E2 may cover the whole of the underside of the crystal X1. For high efficiency the field should be greatest along the center of the path of the light beam. Another possible alternative arrangement is illustrated by FIG. 2. This drawing shows a transverse cross-section of an ADP crystal, having two narrow linear longitudinal electrodes E1 and E4 parallel to each other in one of its surfaces and two narrow linear longitudinal electrodes E2 and E3 parallel to each other on the opposite surface. The crystal of FIG. 2 may be used in place of the crystal X1 of FIG. 1, with its crystal axis oriented as hereinbefore described for the crystal X1, and with the path of the light beam passing parallel to the electrodes E1, E2, E3 and E4, along the axis of symmetry of the arrangement of electrodes (at right angles to the plane of the paper in FIG. 2). The electrodes E1 and E3 are connected to one terminal of the modulation signal source and the electrodes E2 and E4 are connected to the other.

As hereinbefore mentioned, the light guide G could be replaced by an optical aperture in the form of a transparent pinhole in an opaque screen.

The invention clearly requires only a simple arrangement with only one crystal and one aperture to be aligned with the light beam. Since only one type of ray is used, and the production of a specified deflection for a specified signal is not essential, its operation is not critically dependent on temperature and it is not likely to need any readjustment to compensate for temperature changes. The optical transmissivity of the system can be comparatively high, especially when a pinhole aperture is used, for there need only be two interfaces (the ends of the crystal) to cause reflection losses.

The aperture need not necessarily be close to the modulator crystal, but may be separated from it by any convenient distance. The output signal from the system may be used to align the aperature with the beam, and a modified form of the apparatus may be used as an optical alignment device as will now be described. For alignment, a modulation signal of known frequency is applied to the crystal and the position of the aperture is adjusted to maximize the output signal at the second harmonic of the modulation signal. If no direct-voltage bias is superimposed on the modulation signal, the frequency-doubling effect will tend to be greatest when the optical aperture is centered about the path of the beam. Control signals developed from the second harmonic content of the output of a simple system as shown in FIG. 1 will be most effective for guiding alignment in one dimension — the dimension of maximum spreading of the beam. To get equally sensitive alignment in two orthogonal directions at right angles to the path of the beam, two modulator crystals may be used in tandem with modulation voltages of different frequencies applied to them in two orthogonal directions. Two control signals can then be respectively derived from output signal components at the second harmonics of the two modulation frequencies. Apparatus of this kind will now be described with reference to FIG. 3.

Figure 3:
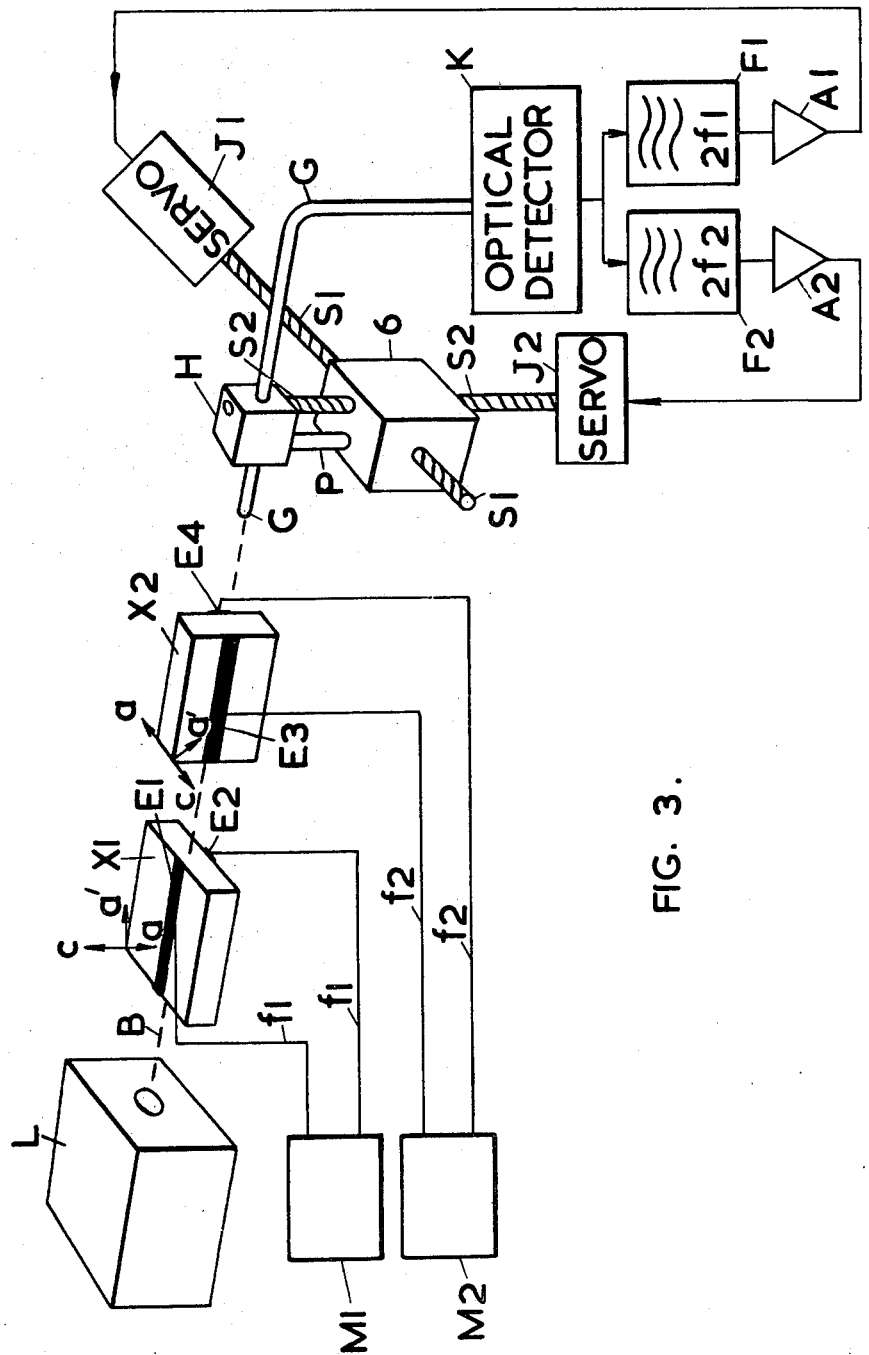
FIG. 3 is a schematic perspective drawing of an aperture alignment apparatus including two electro-optical modulators.

FIG. 3 shows a laser L arranged to project a beam B of coherent light longitudinally through two long slender ADP crystals X1 and X2 arranged in tandem and on to one end of a fiber-optic light guide G. The guide G is held in a holder H which is slideable on a pillar P upstanding from a moveable carriage 6. The holder H may be moved horizontally by a servo motor J1 and a lead screw S1 and vertically by a servo motor J2 and a lead screw S2. The motor J2 is mounted on the carriage 6 and the motor J1 is mounted on a rigid base (not shown). The end of the light guide G remote from the crystals X1 and X2 is connected to an optical detector K. The detector K has two outputs one of which is connected to the input of a filter and rectifier F1 while the other is connected to the input of a filter and rectifier F2. The filter F1 selects a signal component of frequency $2f1$, the filter F2 selects a signal component of frequency $2f2$. The output of the filter and rectifier F1 is connected via an amplifier A1 to drive the servo motor J1 and the output of the filter and rectifier F2 is connected via an amplifier A2 to drive the servo motor J2. A modulation signal source M1 is electrically connected to the narrow linear electrodes E1 and E2 of the crystal X1. A modulation signal source M2 is electrically connected to the narrow linear electrodes E3 and E4 of the crystal X2. The crystals X1 and X2 are similar but are arranged so that the modulation fields applied to them will be at right angles to each other, that is to say X2 has been rotated anticlockwise 90° with respect to X1, about the path of the beam. The modulation source M1 supplies an alternating modulation signal of frequency $f1$ while the modulation source M2 supplies an alternating modulation signal of different frequency $f2$.

The mode of operation of the embodiment of FIG. 3 will now be described. As mentioned hereinbefore the frequency doubling effect is greatest when the beam is centered on the optical aperture formed in this case by the end of the light guide G, hence alignment is achieved when the second harmonics of both modulating frequencies are at a maximum in the modulated light beam. In the embodiment of FIG. 3 the laser beam B is directed through the crystals X1 and X2 on to the light guide G. The modulations are impressed on the beam in the crystals X1 and X2 substantially as hereinbefore described in relation to the apparatus of FIG. 1. However in this case owing to the presence and the orientation of the crystal X2 the beam spreading is modulated in both the vertical and horizontal directions, and the illumination of the optical aperture will be modulated at a frequency of twice $f2$ as well as at the frequency twice $f1$. The detector K produces electrical signals which include the frequencies $2f1$ and $2f2$.

These signals are separated by the filters F1 and F2 which also include rectifiers and smoothing circuits (not shown). The signals from the filters F1 and F2 are amplified by the amplifiers A1 and A2 respectively and are supplied to the servo systems J1 and J2 respectively. The servos J1 and J2 drive the lead screws S1 and S2 respectively and so alter the horizontal and vertical position of the carriage 6 and consequently adjust the light guide holder H. The servos are arranged to stop driving the lead screws when the amplitude of the second harmonics of the frequencies $f1$ and $f2$ are at a maximum. This condition occurs when the light beam B is centered on the end of the light guide G. A similar system may be used to center any optical aperture about a light beam, the aperture being at any desired distance from the modulator crystals.

I claim:

1. An electro-optical modulator comprising a first electro-optic crystal with first electrode means for applying a variable electric field thereto, a second electro-optic crystal with second electrode means for applying a variable electric field thereto, the said first and second crystals having their c-axes orthogonal to one another, optical aperture means of predetermined cross-sectional area, means for projecting a beam of light through the first crystal and thence through the second crystal and onto the said optical aperture means, a first modulation signal source means for applying a first alternating signal having a first frequency to the said first electrode means, a second modulation signal source means for applying a second alternating signal having a second frequency to the said second electrode means, optical detector means connected to the said optical aperture means so as to receive light from the said beam of light through the said optical aperture means, servo means connected to position the said optical aperture means in two orthogonal directions, filter means for filtering the output of the optical detector means so as to provide two output signals consequent upon the first and second alternating signals respectively, and means for applying the said two output signals to the servo means to center the said optical aperture means in the said light beam.

* * * * *

UNITED STATES PATENT OFFICE
CERTIFICATE OF CORRECTION

Patent No. 3,691,484    Dated September 12, 1972

Inventor(s) Marcus John Dore

It is certified that error appears in the above-identified patent and that said Letters Patent are hereby corrected as shown below:

IN THE HEADING:

Please add the following:

[30]    Foreign Application Priority Data

August 15, 1968    Great Britain.....No. 38997/68

Signed and sealed this 13th day of March 1973.

(SEAL)
Attest:

EDWARD M. FLETCHER, JR.
Attesting Officer

ROBERT GOTTSCHALK
Commissioner of Patents